(12) United States Patent
Hunt et al.

(10) Patent No.: US 11,412,661 B2
(45) Date of Patent: Aug. 16, 2022

(54) LIMIT MANAGEMENT FOR AUTOMATIC GROUND-FOLLOWING ACTUATION ON A MULTI-SEGMENT HARVESTING HEAD

(71) Applicant: CNH Industrial America LLC, New Holland, PA (US)

(72) Inventors: Cory D. Hunt, Millersville, PA (US); Jeffrey C. Trowbridge, Stevens, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/294,298

(22) PCT Filed: Oct. 29, 2019

(86) PCT No.: PCT/US2019/058600
§ 371 (c)(1),
(2) Date: May 14, 2021

(87) PCT Pub. No.: WO2020/101886
PCT Pub. Date: May 22, 2020

(65) Prior Publication Data
US 2021/0352847 A1    Nov. 18, 2021

Related U.S. Application Data

(60) Provisional application No. 62/768,370, filed on Nov. 16, 2018.

(51) Int. Cl.
*A01D 41/14*        (2006.01)
*A01D 75/28*        (2006.01)
(Continued)

(52) U.S. Cl.
CPC ............ *A01D 75/287* (2013.01); *A01B 63/10* (2013.01); *A01D 41/141* (2013.01);
(Continued)

(58) Field of Classification Search
CPC ..... A01B 63/10; A01B 63/008; A01D 75/287; A01D 41/141; A01D 41/144;
(Continued)

(56) References Cited

U.S. PATENT DOCUMENTS 5,359,836 A  * 11/1994 Zeuner ................. A01D 41/141
                                                                56/10.2 E
5,704,200 A  *  1/1998 Chmielewski, Jr. ........................
                                                                A01D 41/141
                                                                56/10.2 E (Continued)

FOREIGN PATENT DOCUMENTS

EP     3087819 A2    11/2016
EP     3348132 A1     7/2018

OTHER PUBLICATIONS

International Search Report for PCT application PCT/US2019/058600, dated Jan. 31, 2020 (13 pages).

*Primary Examiner* — Arpad Fabian-Kovacs
(74) *Attorney, Agent, or Firm* — Peter Zacharias; Patrick Sheldrake

(57) ABSTRACT

An agricultural harvester includes a controller configured to receive at least one wing angle signal indicative of an angle at least one wing with respect to a center section of a header. The controller is also configured to receive a wing height position signal indicative of a distance between the at least one wing and a soil surface, determine whether the angle of the at least one wing exceeds an angle limit threshold based at least in part on the wing angle signal, and output a tilt signal to a tilt actuator in response to determining the angle of the wing exceeds the angle limit threshold. The tilt signal is indicative of instructions to maintain the distance between the at least one wing and the soil surface within a target distance threshold.

15 Claims, 6 Drawing Sheets

(51) Int. Cl.
*A01B 63/10* (2006.01)
*F15B 13/044* (2006.01)
*A01B 63/00* (2006.01)
*F15B 11/08* (2006.01)
*F15B 13/04* (2006.01)

(52) U.S. Cl.
CPC .......... *A01D 41/144* (2013.01); *F15B 13/044* (2013.01); *A01B 63/008* (2013.01); *F15B 11/08* (2013.01); *F15B 13/0401* (2013.01); *F15B 2211/426* (2013.01); *F15B 2211/526* (2013.01)

(58) Field of Classification Search
CPC .... F15B 13/044; F15B 11/08; F15B 13/0401; F15B 2211/426; F15B 2211/526
See application file for complete search history.

(56) References Cited

U.S. PATENT DOCUMENTS

| | | | |
|---|---|---|---|
| 6,675,568 B2* | 1/2004 | Patterson | A01D 41/14 56/208 |
| 6,834,223 B2 | 12/2004 | Strelioff et al. | |
| 7,540,130 B2 | 6/2009 | Coers et al. | |
| 8,051,633 B2* | 11/2011 | Figgins | A01D 34/283 56/181 |
| 9,832,921 B2 | 12/2017 | Anderson et al. | |
| 9,968,033 B2* | 5/2018 | Dunn | A01B 63/10 |
| 10,462,968 B2* | 11/2019 | Shearer | A01D 57/20 |
| 10,568,266 B2* | 2/2020 | Vandeven | A01D 67/00 |
| 10,820,511 B2* | 11/2020 | Brimeyer | A01B 63/008 |
| 2007/0068129 A1* | 3/2007 | Strasser | A01D 41/141 56/10.2 E |
| 2008/0072560 A1* | 3/2008 | Talbot | A01D 41/14 56/208 |
| 2013/0305674 A1* | 11/2013 | Patterson | A01D 43/077 56/10.2 A |
| 2015/0013795 A1* | 1/2015 | Ritter | A01D 41/145 137/596.16 |
| 2015/0033692 A1* | 2/2015 | Schroeder | A01D 41/141 56/10.2 E |
| 2016/0183461 A1* | 6/2016 | Neudorf | A01D 41/14 56/158 |
| 2016/0316624 A1* | 11/2016 | Ritter | A01D 41/141 |
| 2017/0064904 A1* | 3/2017 | Figgins | A01D 34/006 |
| 2018/0279549 A1* | 10/2018 | Lacy | A01D 41/141 |
| 2018/0368317 A1* | 12/2018 | Schulze Selting | A01D 34/008 |
| 2019/0230857 A1* | 8/2019 | Thomson | A01D 41/145 |

* cited by examiner

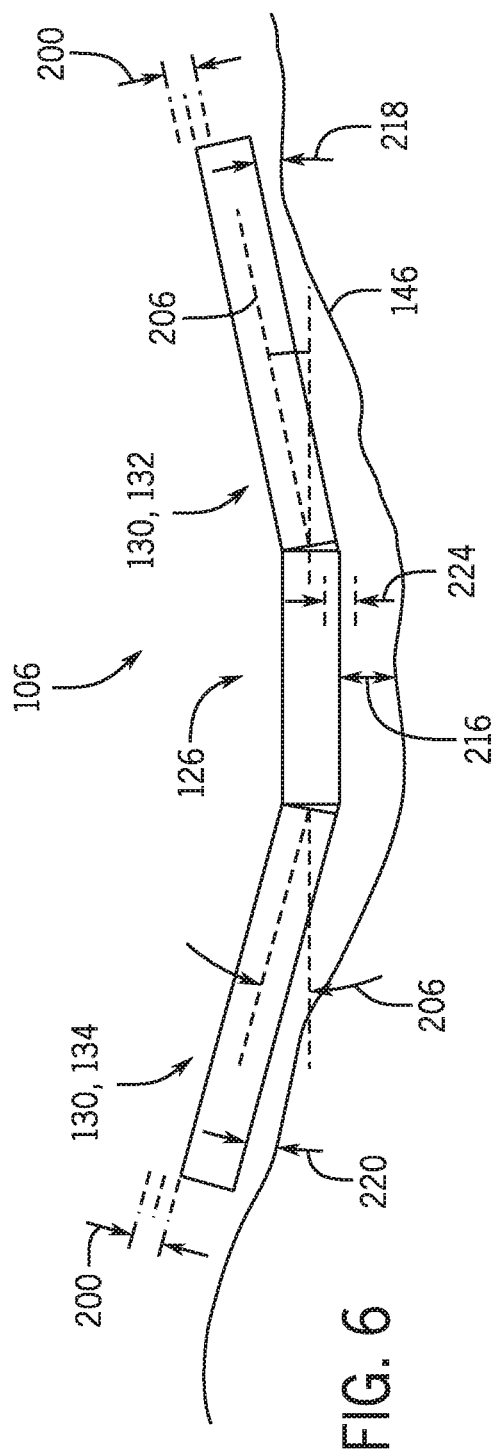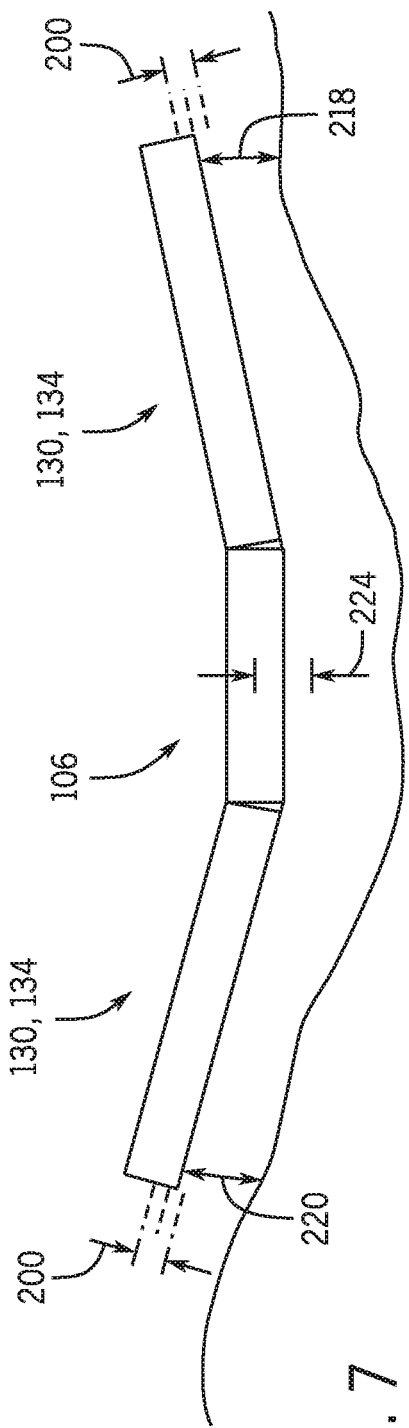

LIMIT MANAGEMENT FOR AUTOMATIC GROUND-FOLLOWING ACTUATION ON A MULTI-SEGMENT HARVESTING HEAD

BACKGROUND

The present disclosure relates generally to limit management techniques for automatic ground-following actuation on a multi-segment harvesting head.

Certain work vehicles (e.g., harvester combines) support a header configured to harvest agricultural product from a field. For example, the work vehicle may support a draper header. Certain headers have a center intake section and a pair of wings. A cutter bar assembly for cutting agricultural crops within the field extends along a front edge of the header. As the cutter bar assembly cuts the agricultural crops, the draper header passes under the cut agricultural crops, the cut agricultural crops fall onto conveyors of the header, and the conveyers direct the cut agricultural crops to an intake of the intake section. Some headers include actuators configured to raise and lower the wings. For example, on an uneven work surface, raising a wing of the header may position the cutter bar assembly at a target height above an inclined portion of the work surface. Additionally, on a declined portion of the work surface, lowering the wing may also position the cutter bar assembly at a target height above. However, the wings of the header have limited range of motion and may only rotate a finite number of degrees. Accordingly, the target cutting height may not be maintained at the wing.

BRIEF DESCRIPTION

In certain embodiments, an agricultural harvester includes a controller configured to receive at least one wing angle signal indicative of an angle at least one wing with respect to a center section of a header. The controller is also configured to receive a wing height position signal indicative of a distance between the at least one wing and a soil surface, determine whether the angle of the at least one wing exceeds an angle limit threshold based at least in part on the wing angle signal, and output a tilt signal to a tilt actuator in response to determining the angle of the wing exceeds the angle limit threshold. The tilt signal is indicative of instructions to maintain the distance between the at least one wing and the soil surface within a target distance threshold.

DRAWINGS

These and other features, aspects, and advantages of the present disclosure will become better understood when the following detailed description is read with reference to the accompanying drawings in which like characters represent like parts throughout the drawings, wherein:

FIG. 6 is a front view of the header of FIG. 4, in which a center section is in a tilted position and both wings are in a raised position;

FIG. 7 is a front view of the header of FIG. 4, in which the header is in a lifted position.

DETAILED DESCRIPTION

Figure 1:
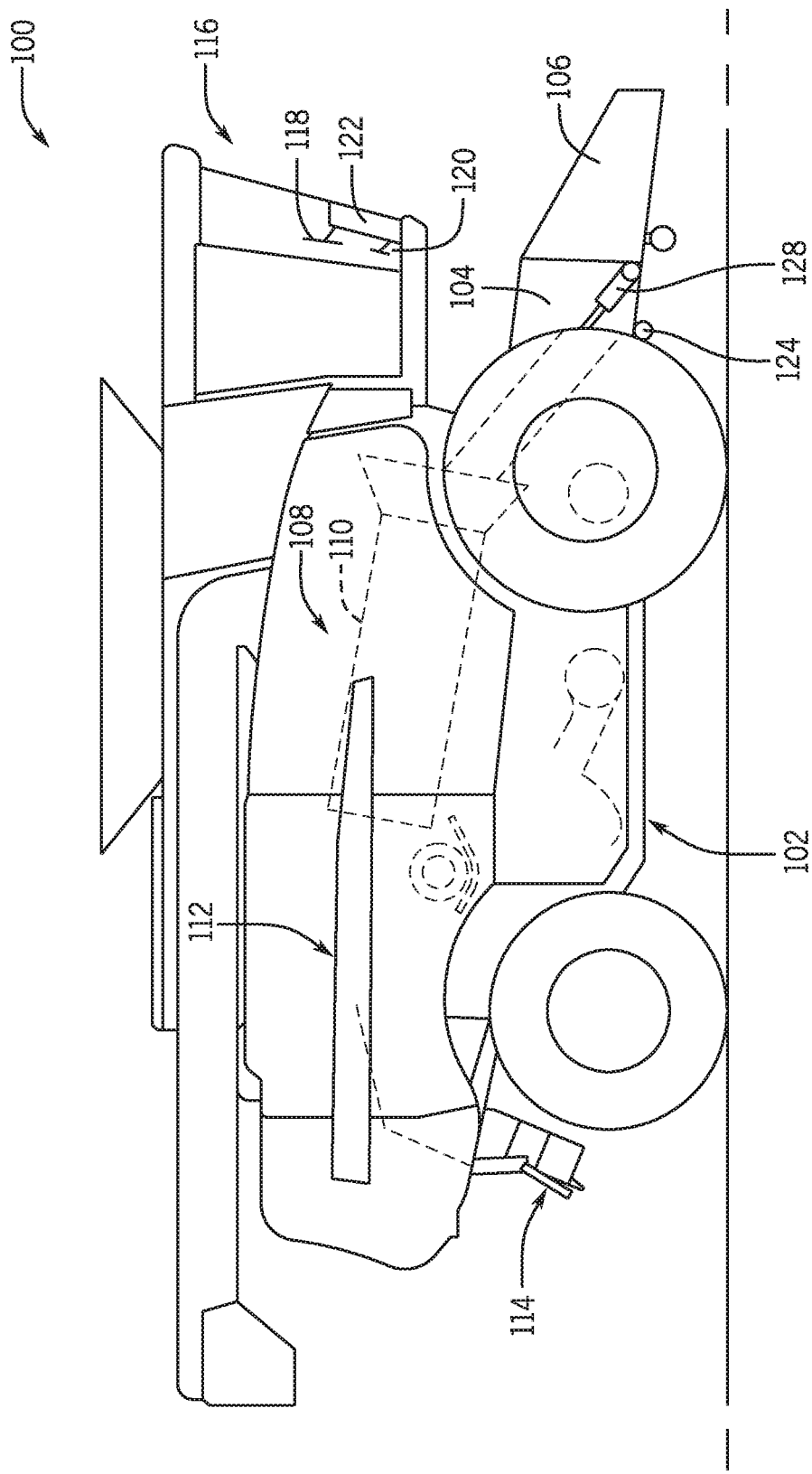
FIG. 1 is a side view of an embodiment of an agricultural harvester having a work vehicle and a header coupled to the work vehicle.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The process of farming typically begins with planting seeds within a field. Over time, the seeds grow and eventually become harvestable crops. Typically, only a portion of each crop is harvested (e.g., the usable material is separated from the remainder of the crop during the harvesting process). For example, a work vehicle (e.g., harvester) may cut agricultural crops within a field via an agricultural header (e.g., header). The agricultural header may also gather the cut agricultural crops into a processing system of the work vehicle for further processing. The processing system may include a threshing machine configured to thresh the agricultural crops, thereby separating the crops into certain desired agricultural materials, such as grain, and material other than grain (MOG). The desired agricultural materials may be sifted and then accumulated into a tank. When the tank fills to capacity, the materials may be collected from the tank. The MOG may be discarded from the work vehicle (e.g., via a spreader).

As mentioned above, the header may cut agricultural crops as part of the harvesting process. To increase yield from a harvest the crops may be cut at a target height. Thus, the work vehicle may position the header such that the cutter bar assembly cuts the crops at the target height. However, many fields have uneven terrain, which may cause the cutter bar assembly to be positioned at varying heights along a width of the header. To reduce a variance in cutter bar assembly height along the width of the header, certain headers include wing portions that may move (e.g., lower, raise) with respect to a center portion of the header. However, to maintain the target cutting height over some terrain, the wing portions to move, via rotation of the wing portions with respect to the center portion, to a maximum rotation angle of the wing portion. Any more variation (e.g., steep slope) and the wing may not be able to rotate to an orientation that positions the cutter bar assembly at the target cutting height. Thus, in accordance with certain embodiments, a system or method for reducing variance in cutter bar assembly height on steeply sloped terrain is provided.

Turning now to the drawings, FIG. 1 is a side view of an embodiment of an agricultural harvester 98. The agricultural harvester 98 includes a work vehicle 100. The work vehicle 100 includes a chassis 102 and a feeder house 104 movably coupled to a front portion of the chassis. The feeder house base 104 is configured to actuate with respect to the chassis 102. Further, a header 106 is coupled to the work vehicle 100. In some embodiments, the header 106 is coupled to the feeder house base 104 at an end opposite the work vehicle 100. The header 106 (e.g., draper header) is configured to cut agricultural crops. Cut crops are directed, via the header 106, toward an inlet of a crop processing system 108 of the work vehicle 100. The crop processing system 108 receives cut crops from the header 106. In some embodiments, the crop processing system 108 includes a thresher 110 that conveys a flow of cut crops through the crop processing system 108. The thresher 110 may include a cylindrical threshing rotor that transports the crops in a helical flow path. In addition to transporting the crops, the thresher 110 may also separate certain desired crop material (e.g., grain) from residue (e.g., MOG), such as husk and pods, and direct the residue into a cleaning system located beneath the thresher 110. The residue may be transported to a crop residue handling system 112, which may hold the crop residue for further processing and/or expel the crop residue from the work vehicle 100 via a crop residue spreading system 114 positioned at the aft end of the work vehicle 100.

The work vehicle 100 may include a cab 116 for seating a user (e.g., work vehicle driver) during operation of the agricultural harvester 98. The user may control various parameters of the agricultural harvester 98 via controls disposed in the cab 116. For example, the cab 116 may have a steering wheel 118 configured to control a direction of the work vehicle and/or pedals 120 configured to control a speed of the work vehicle 100. The vehicle may also include a user interface 122. The user interface 122 may be connected to a control system for the work vehicle 100. Various component of the work vehicle 100 may be connected to the control system such that the user may input desired parameters for the various components of the agricultural harvester 98 via the user interface 122.

In the illustrated embodiment, the agricultural harvester 98 includes a tilt actuator 124. The tilt actuator 124 may be coupled to the feeder house base 104 and to the chassis 102 of the work vehicle 100. In some embodiments, the tilt actuator 124 is coupled to the feeder house 104. In another embodiments, the tilt actuator 124 is coupled to a faceplate of the feeder house. The faceplate of the feeder house may be moveably connected to a main portion of the feeder house, and the header 106 may couple to the feeder house 104 via the faceplate of the feeder house. The tilt actuator 124 may be a hydraulic, pneumatic, or electric actuator. A power source (e.g., hydraulic fluid source) for the tilt actuator 124 may be disposed on the work vehicle 100. The tilt actuator 124 is configured to rotate a center section of the header 106 with respect to the work vehicle via rotation of the feeder house base (e.g., in response to instructions from a controller). For example, the tilt actuator 124 may be a hydraulic actuator. Thus, a valve block assembly may be configured to regulate hydraulic pressure from the fluid source to the tilt actuator 124 in response to instructions from the controller. Regulating hydraulic pressure controls actuation of the hydraulic actuator. Moreover, the controller may be configured to instruct the actuator 124 to tilt the center section based on a slope in the field along the path of the work vehicle. Moreover, the controller may be configured instruct the tilt actuator 124 to tilt the center section 126 in response to a header wing reaching a maximum rotation angle with respect to the center section of the header 106. In some embodiments, the tilt actuator 124 has a maximum tilt angle threshold and a minimum tilt angle threshold. For example, the tilt actuator 124 be configured to rotate the feeder house base and/or the center section of the header +/−8 degrees from a neutral position, such that the maximum tilt angle threshold is 8 degrees and the minimum tilt angle threshold is −8 degrees. In another embodiment, the maximum tilt angle threshold is 6 degrees and the minimum tilt angle threshold is −6 degrees. In a further embodiment, the maximum tilt angle threshold is 4 degrees and the minimum tilt angle threshold is −4 degrees.

In the illustrated embodiment, the agricultural harvester includes a lift actuator 128. The lift actuator 128 may be a hydraulic actuator. Thus, the valve block assembly may be configured to regulate hydraulic pressure from the fluid source to the lift actuator 128 in response to instructions from the controller. Regulating hydraulic pressure controls actuation of the hydraulic actuator. The lift actuator 128 is coupled to the feeder house base 104 and to the chassis 102 of the work vehicle 100. The lift actuator 128 is configured to lift the center section 126 via movement of the feeder house base 104. The lift actuator 128 may be configured to lift and lower the center section based at least in part on instructions from a controller. The controller may be configured to instruct the lift actuator to lift or lower the feeder house base 104 and/or the center section of the header 106 based on a detected field feature (e.g., rock, high spot, low spot, etc.) in the path of the work vehicle. Moreover, the controller may be configured to instruct the lift actuator to lift the center section based at least in part on a determination that the header wing (e.g., a left header wing or a right header wing) is at a maximum rotation angle with respect to the center section of the header. Thus, the controller may configured to instruct the lift actuator to lift only when the tilt actuator is at the maximum angle threshold or the minimum angle threshold. Tilting the feeder house base 104 and/or the center section of the header 106 before lifting the feeder house base 104 and/or the center section of the header 106 allows the cutter bar assembly at the center section of the header to remain at the target cutting height over more variations of terrain than lifting the feeder house base 104 and/or the center section of the header 106 before tilting the feeder house base 104 and/or the center section of the header 106.

Figure 2:
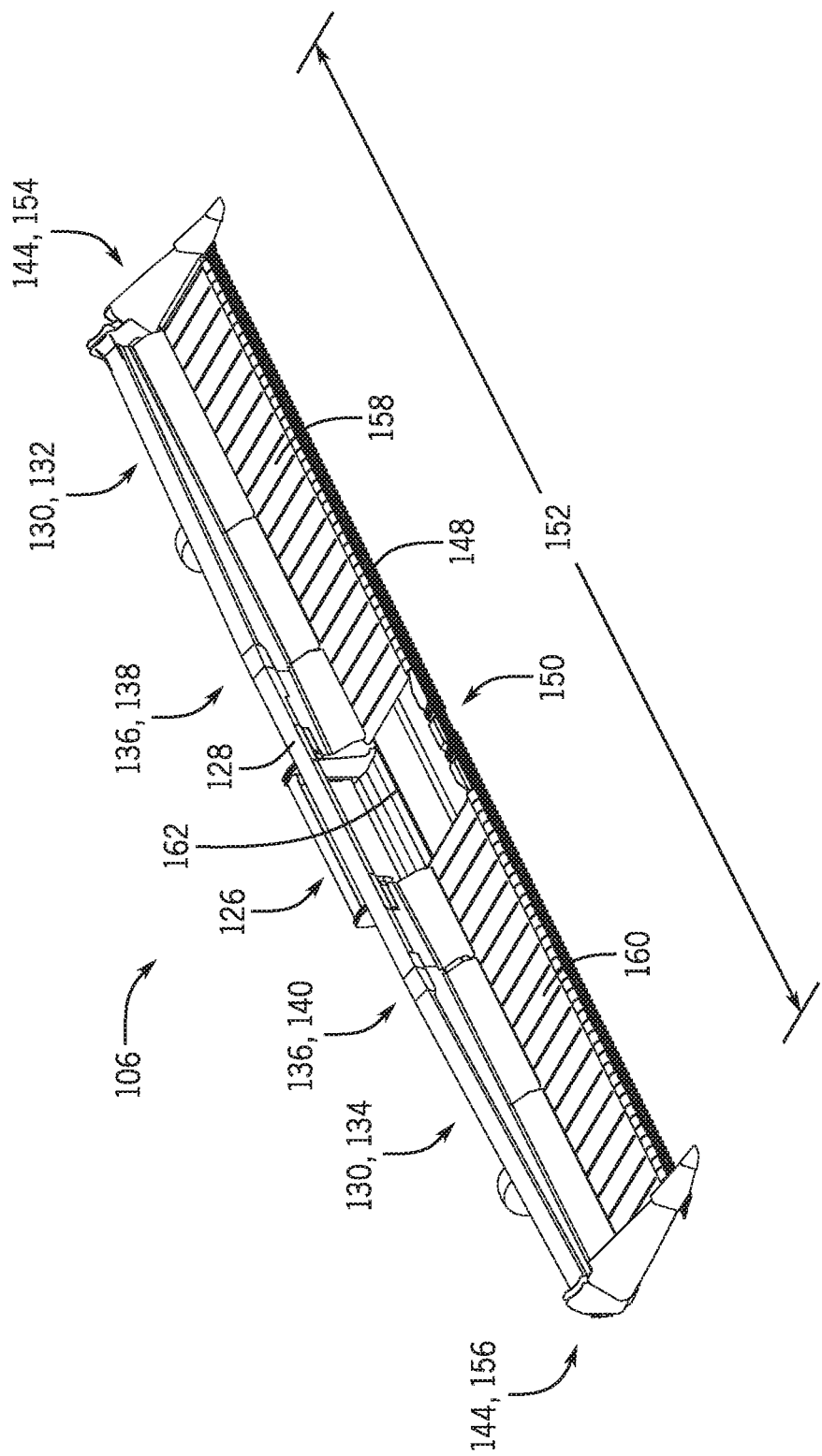
FIG. 2 is a perspective view of an embodiment of a header that may be employed within the agricultural harvester of FIG. 1.

FIG. 2 is a perspective view of an embodiment of a header that may be employed with the agricultural harvester of FIG. 1. As discussed above the header 106 includes a center section 126 configured to couple to the feeder house base. In addition, the header 106 includes header wings 130. In the illustrated embodiment, the header 106 includes a left header wing 132 and a right header wing 132. Each header wing 130 is configured to rotate (e.g., lift, lower) with respect to the center section 126. The header 106 includes header wing actuators 136 configured to rotate the respective header wings 130 in response to instructions from a controller. Each header wing actuator 136 may be a hydraulic, pneumatic, or electric actuator. In some embodiments, each header wing actuator 136 may include a cylinder body, a piston disposed within the cylinder body, and a rod extending from the piston. The rod may extend and retract with respect to the cylinder body in response to fluid flow to the wing actuator. The rod may be coupled to a portion of the respective header wing 130, and the cylinder body may be coupled to a portion of the center section 126. Moreover, in some embodiments, the left and right header wings are configured to move independently of each other. For example, the left header wing 132 may lift with respect to the center section 126 while the right header wing 134 lowers with respect to the center section 126 (e.g., to maintain the target cutting height across the width of the header). In the illustrated embodiment, the header 106 includes a left header wing actuator 138 configured to move the left header wing 132 and a right header wing actuator 140 configured to move the right header wing 134.

In some embodiments, each header wing 130 is coupled to the center section 126 of the header via at least one rotatable joint. The at least one rotatable joint may include a hinge joint, ball joint, etc. Each header wing actuator 136 may be configured to move a distal end 144 of the header wing 130 with respect to the center section 126 of the header 106. Each header wing actuator 136 may rotate the respective header wing 130 about the at least one rotatable joint. Each header wing actuator 136 may include a cylinder body, a piston disposed within the cylinder body, and a rod extending from the piston. The rod may extend and retract with respect to the cylinder body in response to fluid flow to the wing actuator. The rod may be coupled to a portion of the respective header wing 130, and the cylinder body may be coupled to a portion of the center section 126. Each header wing actuator 136 may be positioned such that extension and retraction of the respective rod with respect to the respective cylinder causes each header wing 130 to move with respect to the center section 126 about the at least one rotatable joint. Moving each header wing 130 with respect to the center section 126 may cause each header wing 130 to lift or lower with respect to a ground surface 146.

In some embodiments, the header wing actuator 136 is coupled to a gauge wheel and to a frame of the header wing. The gauge wheel is coupled to a frame of the header wing 130. The gauge wheel may be configured to move along the soil surface. The gauge wheel may be configured to at least partially support the header wing 130. In some embodiments the gauge wheel and the header wing actuator 136 are configured to support the header wing 130. In another embodiment, only the gauge wheel is configured to support the header wing 130. In other embodiments, only the header wing actuator 136 is configured to support the header wing 130.

As discussed above, the header (e.g., draper header) is configured to cut agricultural crops and direct the cut crops toward an inlet of the crop processing system. In the illustrated embodiment, the header 106 includes a cutter bar assembly 148 disposed on a front portion 150 of the header 106, opposite the work vehicle. The cutter bar assembly 148 extends along a width 152 of the front portion 150 of the header 106. For example, the cutter bar assembly 148 may extend from a distal end 154 of the left header wing 132 to a distal end 156 of the right header wing 134.

Further, in the illustrated embodiment, the header 106 includes a conveyor system. The portions of the crops that are cut by the cutter bar assembly 148 may be directed onto a respective conveyor of the header 106 by a reel assembly. The conveyor system includes a conveyor disposed on each header wing 130. As illustrated, the left header wing 132 has a left conveyor 158, and the right header wing 134 has a right conveyor 160. Each of the left conveyor 158 and the right conveyor 160 may be configured to direct crops toward the center section 126. The center section 126 has a center section conveyor 162 configured to direct crops toward an inlet of the feeder house base leading to the processing system. However, in another embodiment, the header may include an auger system, including an auger that extends across the width of the header 106 between a left side portion and a right side portion of the header 106. The auger may direct the harvested crop material toward the inlet of the feeder house base.

Figure 3:
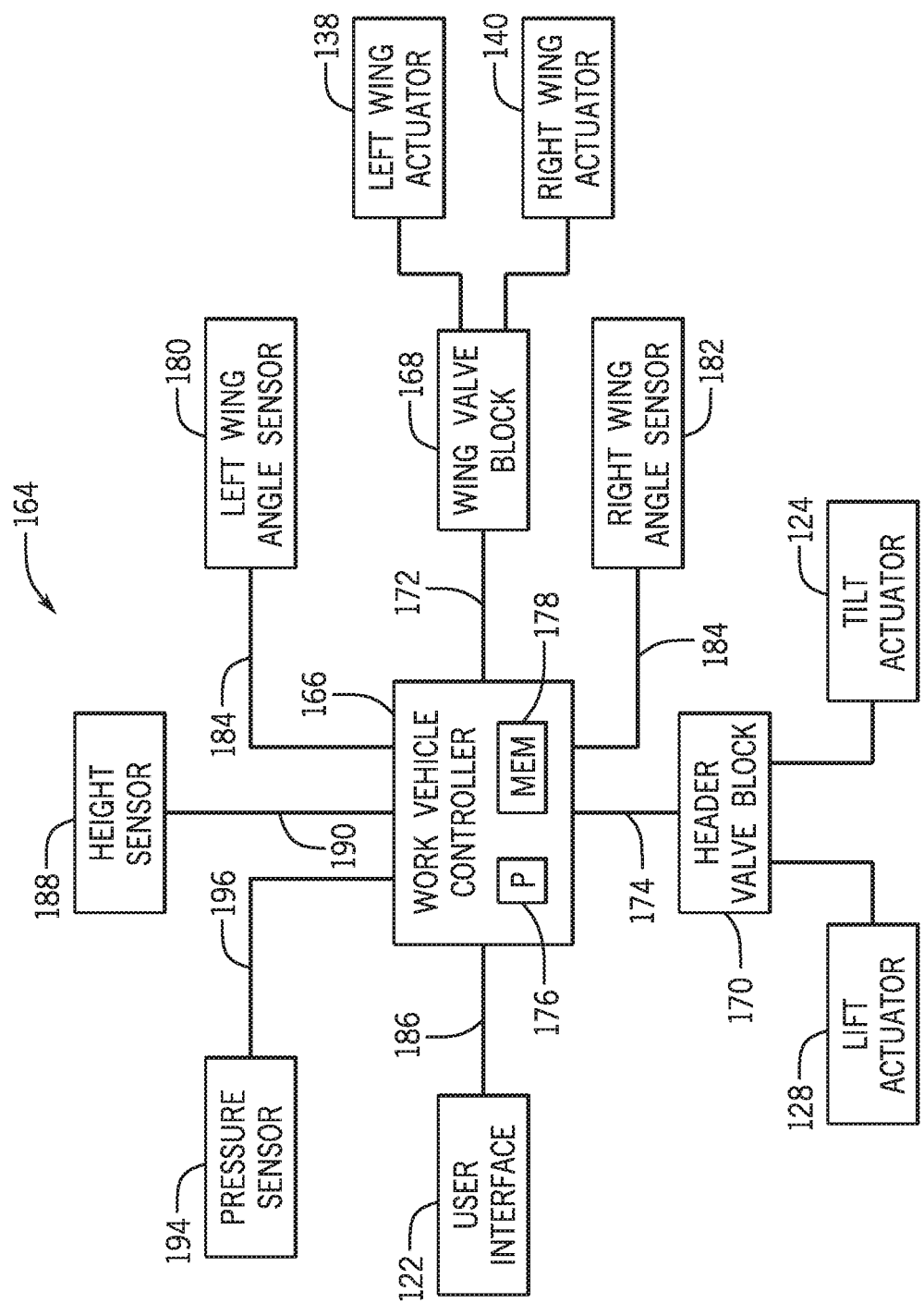
FIG. 3 is a block diagram of an embodiment of a control system for agricultural harvester of FIG. 1.

FIG. 3 is a block diagram of an embodiment of a control system 164 for the agricultural harvester. The control system 164 includes a work vehicle controller 166 configured to control movement of the header. In the illustrated embodiment, the work vehicle controller 166 is communicatively coupled to a wing valve block 168 and a header valve block 170. The work vehicle controller 166 may output a wing control signal 172 indicative of instructions to control the header wing actuators 136 (e.g., indicative of instructions to move (e.g., lift or lower) the header wing(s) 130 with respect to the center section 126 of the header). Further, the controller may output a header control signal 174 indicative of instructions to control the lift actuator 128 and/or the tilt actuator 124 (e.g., to move (e.g., tilt and/or lift) the center section 126 of the header 106 with respect to the work vehicle). In some embodiments, the work vehicle controller 166 communicates with the header valve block 170 and the wing valve block 168 via a network (e.g., Controller Area Network Binary Unit System "CANBUS"). The work vehicle controller 166 includes a processor 176, such as the illustrated microprocessor, and a memory device 178. The controller may also include one or more storage devices and/or other suitable components. Moreover, the processor 176 may include multiple microprocessors, one or more "general-purpose" microprocessors, one or more special-purpose microprocessors, and/or one or more application specific integrated circuits (ASICS), or some combination thereof. For example, the processor 176 may include one or more reduced instruction set (RISC) processors.

The memory device 178 may include a volatile memory, such as random access memory (RAM), and/or a nonvolatile memory, such as read-only memory (ROM). The memory device 178 may store a variety of information and may be used for various purposes. For example, the memory device 178 may store processor-executable instructions (e.g., firmware or software) for the processor 176 to execute. The storage device(s) (e.g., nonvolatile storage) may include ROM, flash memory, a hard drive, or any other suitable optical, magnetic, or solid-state storage medium, or a combination thereof. The storage device(s) may store data (e.g., geometry data, etc.), instructions (e.g., software or firmware), and any other suitable data.

The control system 164 includes wing angle sensors (e.g., the left wing angle sensor 180 and the right wing angle sensor 182) each configured to output a wing angle signal 184 indicative of a wing angle (e.g., the angle of the header wing with respect to the center section of a header). For example, the center section of the header and the distal end of the header wing may both be disposed about six inches above a level soil surface. Thus, the header wing is in a neutral position and the wing angle is about zero degrees. In another example, the center section of the header is disposed about six inches above the level soil surface, but the distal end of the header wing is disposed about twelve inches above the level soil surface. Thus, the header wing is in a lifted position, and the wing angle is a positive value (e.g., 7 degrees). In a further example, the center section of the header is disposed about six inches above the level soil surface, but the distal end of the header wing is disposed about three inches above the level soil surface. Thus, the header wing is in a lowered position, and the wing angle is a negative value (e.g., −3.5 degrees).

Each header wing actuator 136 (e.g., the left header wing actuator 138 or the right header wing actuator 140) may be configured to rotate the respective header wing with respect to the center section. For example, the header wing actuator may rotate the respective header wing to a target wing angle in response to instructions from the work vehicle controller 166 to move the header wing to an orientation that maintains the header wing at a target height 226 above the soil surface. However, the wing actuator may only be capable of rotating the header wing through a range of motion. For example, a piston rod may have a maximum extension relative to the cylinder body. Thus, the maximum rotation angle of the header wing may be at an angle corresponding to maximum extension of the wing actuator piston rod. Moreover, the minimum rotation angle of the header wing may be at an angle corresponding to full retraction of the piston rod.

In some embodiments, the controller 166 is configured to receive an angle limit threshold. For example, a user interface 122 may be configured to receive input from a user and output an angle limit threshold signal 186 to the work vehicle controller 166. In some embodiments, the angle limit threshold is stored in the memory device 178 of the controller. The angle limit threshold may be an angle value less than the maximum rotation angle and greater than the minimum rotation. For example, the angle limit threshold may be 7 degrees for a header wing having a maximum rotation angle of 8 degrees. In some embodiments, the angle limit threshold includes an upper angle limit threshold and a lower angle limit threshold. For example, the upper angle limit may be 5 degrees for a maximum rotation angle of 6 degrees, and the lower angle limit threshold may be −5 degrees for a minimum rotation angle of −6 degrees. The upper angle limit threshold may be at 95 percent range of motion of the header wing, with the range of motion starting from the minimum rotation angle and going to 100 percent at the maximum rotation angle. Moreover the lower angle limit threshold is at 5 percent of the range of motion of the header wing. In another embodiments, the upper angle limit threshold may be at the maximum rotation angle and the lower angle limit threshold may be at the minimum rotation angle.

Moreover, the control system 164 may include a height position sensor 188 configured to output a height position signal 190 indicative of a height of the header with respect to the soil surface. For example, the height position signal 190 may indicate that the distal end of the right header wing is disposed two inches above the soil surface 146. In some embodiments, the control system 164 includes a left wing height sensor, a right wing height sensor, and a center section height sensor configured to output a left wing height position signal, a right wing height position signal, and a center section height position signal, respectively.

In some embodiments, the work vehicle controller 166 is configured to receive a header wing target height 226 and/or a header wing target height threshold. The work vehicle controller 166 may be configured to receive the header wing target height and/or the header wing target height threshold via a target height signal 192 output from the user interface 122. In other embodiments, the header wing target height and/or the header wing target height threshold may be stored on the memory device 178 of the controller 166. In another embodiment, the controller determines the header height based at least in part on input such as a map of the field. The header wing target height may correspond to the target cutting height for the header wings 130. The header wing target height threshold may correspond to target cutting height range for the wings 130. In some embodiments, the header wing target height threshold includes a lower target height threshold limit of 95 percent of a target height and an upper target height threshold limit of 105 percent of the target height. In some embodiments, the header wing target height may correspond to the target cutting height for the header 106, including the header wings 130 and the center section 126 of the header.

In some embodiments, the control system 164 has a pressure sensor 194 configured to output a wing pressure signal 196 indicative of a fluid pressure in at least one wing actuator 136. The work vehicle controller 166 may be configured to determine the wing angle based at least in part on the wing pressure signal. For example, the work vehicle controller 166 may determine that extension of the header wing actuator 136 exceeds an upper or lower extension threshold based at least in part on the detected pressure value. The work vehicle controller 166 may be configured to determine that the wing angle exceeds the angle limit threshold when the extension of the header wing actuator 136 exceeds the upper or lower extension threshold.

Figure 4:
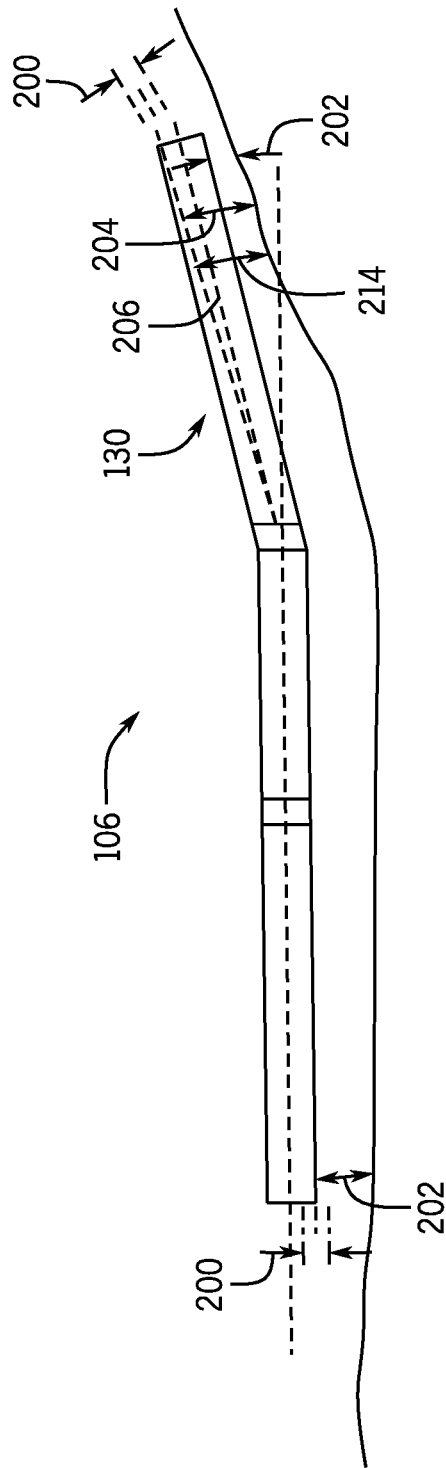
FIG. 4 is a front view of an embodiment of the header of FIG. 2, in which a left wing is in a raised position.

FIG. 4 is a front view of the header of FIG. 2, in which the left header wing 132 is in a raised position. The work vehicle controller may be configured to output instructions to the wing valve block and the header valve block to maintain the header 106 at a target cutting height. In some embodiments, the work vehicle controller is configured to receive a wing height position signal (e.g., the left wing height position signal and/or the right wing height position signal) indicative of a height 202 of the header wing and the center section 126 height position signal indicative of a height 216 of the center section of the header. The work vehicle controller may be configured to determine whether the header wing 130 is positioned within the header wing target height threshold 200 based at least in part on the height 202 of the header wing.

The work vehicle controller may be configured to output a header wing control signal in response to determining that the header wing 130 is positioned above or below the header wing target height threshold 200. The wing valve block may receive the header wing control signal and drive the wing actuator (e.g., left wing actuator or right wing actuator) to move (e.g., lift or lower) the header wing 130 with respect to the center section 126.

However, in the illustrated embodiment, the header wing is at the angle limit threshold 206. The wing actuator may not move the header wing 130 beyond the angle limit threshold 206. In some embodiments, the wing actuator may not actuate the header wing beyond a maximum rotation angle 204. Thus, the wing actuator may not move the header wing 130 to a position within the header wing target height threshold 200 when the header wing 130 is oriented at or above the angle limit threshold 206. The wing angle sensor (e.g., left wing angle sensor or right wing angle sensor) is configured to output the wing angle signal (e.g., left wing angle signal or right wing angle signal). The controller may be configured to receive the wing angle signal and determine whether the wing angle 214 exceeds the angle limit threshold 206. The controller may output a tilt signal to the header valve block in response to determining the wing angle 214 of the header wing exceeds the angle limit threshold 206 to move the header wing 130 to a position within the header wing target height threshold 200.

Figure 5:
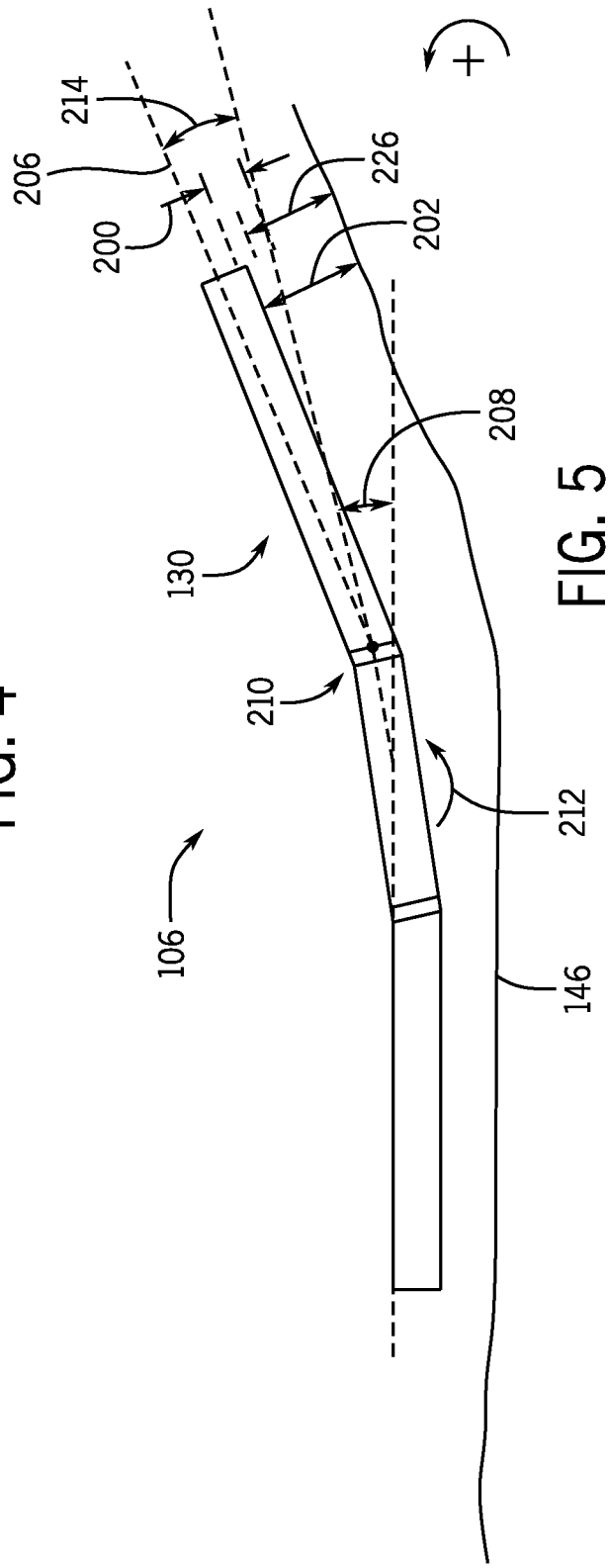
FIG. 5 is a front view of the header of FIG. 4, in which a center section is in a tilted position.

FIG. 5 is a front view of the header 106 of FIG. 4, in which the center section 126 is in a tilted position. The wing angle 214 may be at the angle limit threshold 206. The header valve block may receive the tilt signal from the work vehicle controller and drive the tilt actuator 124 to tilt (e.g., rotate) the center section 126 of the header to a tilt angle 208 in response to receiving the tilt signal. Tilting the center section 126 of the header may raise or lower the header wing 130 even when the header wing 130 is at the angle limit threshold 206 or the maximum/minimum rotation angle. The header wing 130 is coupled to the center section 126. Thus, rotating the center section 126 rotates the header wing 130. In the present embodiment, a left side 210 of the center section 126 is rotated upwardly in a positive angular direction 212 to lift the header wing 130. Rotating the center section 126 in the positive angular direction moves the header wing 130 in the positive angular direction, which lifts the header wing 130 with respect to the soil surface 146 such that the cutter bar assembly of the header wing 130 is positioned within the header wing target height threshold 200.

FIG. 6 is a front view of the header 106 of FIG. 4, in which the center section 126 is in a tilted position and both the left header wing 132 and the right header wing 134 are in a raised position. In some embodiments, the work vehicle controller may receive a header height position signal indicative of a height 216 of the header with respect to the soil surface 146. Further, the work vehicle controller may receive a header target height threshold. The work vehicle controller may output the lift signal to the header valve block in response to determining that the height of the center section 126 of the header is outside of the target header height threshold 224. The header valve block may receive the lift signal and drive the lift actuator to lift the center section 126 of the header. Lifting the center section 126 of the header lifts both the center section 126 of the header and the header wings 130. In some embodiments, the work vehicle controller may output the lift signal in response to determining that tilting the center section 126 to lift the header wing lowers a portion of the center section 126 of the header below the target header height threshold 224. For example, rotating a right side of the center section upwardly in a positive angular direction to lift the right header wing rotates a left side of the center section downwardly in a negative angular direction. The controller may output the lift signal in response to determining that the left side of the center section is lower than the target header height threshold.

In the illustrated embodiment, the controller is configured to receive the left wing height position signal, the right wing height position signal, the left wing angle signal and the right wing angle signal. In some embodiments, the controller determines the left wing angle and the right wing angle based at least in part on a header height position signal, the left wing height position signal, and the right wing height position signal. The controller, as set forth above, may determine whether a left header wing height 218 is outside the header wing target height threshold 200 and whether the left wing angle exceeds the angle limit threshold 206. Moreover, the controller may determine whether a right header wing height 220 is outside the header wing target height threshold 200 and whether the right wing angle exceeds the angle limit threshold 206. When both the left wing angle and the right wing angle exceed the angle limit threshold 206, tilting the center section will lift one of the header wings 130 and lower the other. Thus, tilting the center section may not raise both header wings 130 to the header wing target height threshold. Therefore, the work vehicle controller may output the lift signal in response to determining that the left wing angle exceeds the angle limit threshold 206, the right wing angle exceeds the angle limit threshold 206, the left wing is below the header wing target height threshold 200, and the right wing is below the header wing target height threshold 200. Lifting the center section may lift both header wings 130 to the wing target height threshold 200.

FIG. 7 is a front view of the header 106 of FIG. 6, in which the header is in a lifted position. In some embodiments, the header valve block is configured to receive the lift signal from the work vehicle controller. The header valve block is configured to control the lift actuator in response to receiving the lift signal. Controlling the lift actuator moves (e.g., lifts 228 or lowers) the center section 126 of header. In the present embodiment, the lift actuator is extended to lift the center section 126 of the header such that the left header wing height 218 and the right header wing height 220 are within the header wing target height threshold 200.

Figure 8:
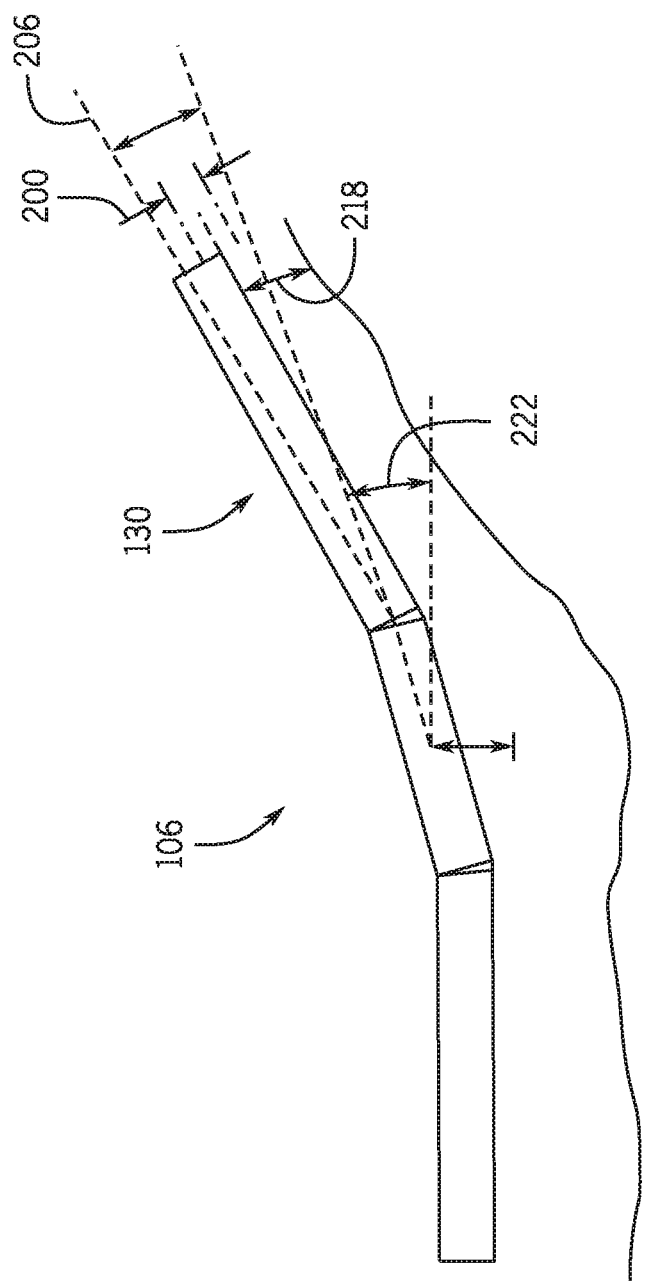
FIG. 8 is a front view of the header FIG. 4, in which the center section and one wing are at a maximum tilt angle.

FIG. 8 is a front view of the header 106 of FIG. 4, in which the center section and the header wings are at a maximum tilt angle threshold 222. In some embodiments, the controller is configured to output the lift signal in response to determining that the rotation of the tilt actuator exceeds a maximum tilt angle threshold 222. For example, the left header wing 132 may be rotated to the angle limit threshold 206 to lift the header wing. Additionally, the tilt actuator may rotate the center section 126 to lift the left header wing 132. In response to the center section 126 reaching the maximum tilt angle threshold 222, the lift actuator lifts the center section 126, such that the left header wing 132 is within the header wing target threshold 200. Thus, the controller may output the lift signal to further lift the left header wing 132 to the position within the header wing target height threshold 200. In the present embodiment, to position the left header wing 132 within the header wing target height threshold 200, the left header wing 132 is rotated to the angle limit threshold 206, then the tilt actuator is rotated to the maximum tilt angle threshold 222, and then the lift actuator is actuated to lift 228 the center section 126 and the left header wing 132. In the present embodiment, to position the left header wing 132 within the header wing target height threshold 200, the left header wing 132 is rotated to the angle limit threshold 206, then the tilt actuator is rotated to the maximum tilt angle threshold 222, and then the lift actuator is actuated to lift 228 the center section 126 and the left header wing 132.

The work vehicle controller may output any combination of wing control signals, tilt signals, and lift signals based on the wing angle signals and/or height position signals to maintain the header wings within the header wing target height threshold 200 and the center section 126 within or above the target header height threshold.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural harvester, comprising:
a header configured to couple to a work vehicle of the agricultural harvester, wherein the header comprises:
a center section;
a tilt actuator configured to rotate the center section with respect to the work vehicle and a lift actuator configured to translate the center section with respect to the work vehicle;
a right wing rotatably coupled to a right side of the center section; and
a left wing rotatably coupled to a left side of the center section, wherein the left wing and the right wing are configured to rotate with respect to the center section; and
a controller comprising a processor and a memory device, wherein the controller is configured to:
receive right and left wing angle signals indicative of respective angles of the right wing and the left wing with respect to the center section of the header;
receive right and left wing height position signals indicative of respective distances between the right wing and the left wing and a soil surface;
determine whether the angle of the right wing, the left wing, or both exceeds an angle limit threshold based at least in part on the right and left wing angle signals;
output a tilt signal to the tilt actuator in response to determining that the left wing angle or the right wing angle exceeds the angle limit threshold, wherein the tilt actuator is configured to drive the center section to tilt in response to receiving the tilt signal, and the tilt signal is indicative of instructions to maintain the respective distances between the right wing and the left wing and the soil surface within a target height threshold; and
output a lift signal to the lift actuator in response to determining that the right wing angle and the left wing angle exceed the angle limit threshold to drive the center section to translate, wherein the lift signal is indicative of instructions to maintain the respective distances between the right and left wings and the soil surface within the target height threshold;
wherein the tilt actuator comprises a maximum tilt angle threshold, and the controller is configured to output the lift signal in response to determining that rotation of the tilt actuator exceeds the maximum tilt angle threshold.

2. The agricultural harvester of claim 1, further comprising a right wing angle sensor and a left wing angle sensor each configured to output the respective right and left wing angle signals indicative of the respective angles of the right wing and the left wing with respect to the center section.

3. The agricultural harvester of claim 2, wherein the wing angle sensor comprises an angular position sensor or a rotary encoder.

4. The agricultural harvester of claim 1, wherein the right wing comprises a right wing actuator configured to rotate the right wing with respect to the center section, and wherein the left wing comprises a left wing actuator configured to rotate the left wing with respect to the center section.

5. The agricultural harvester of claim 4, wherein the right wing actuator, the left wing actuator, or both comprise a hydraulic, pneumatic, or electric cylinder configured to rotate the right wing, the left wing, or both with respect to the center section.

6. The agricultural harvester of claim 4, further comprising a pressure sensor configured to output the at least one wing angle signal based on a fluid pressure within the right or left wing actuator.

7. The agricultural harvester of claim 1, wherein the target height threshold comprises a lower target height threshold limit at a height below a target height and an upper target height threshold limit at a height above the target height, and the controller is further configured to receive the target height from a user interface.

8. The agricultural harvester of claim 1, wherein the header further comprises a cutter bar assembly from a distal end of the left wing to a distal end of the right wing, and wherein the cutter bar assembly is disposed on a front portion of the header, opposite the work vehicle.

9. The agricultural harvester of claim 1, further comprising at least one wing height sensor configured to output the right and left wing height position signals indicative of the respective distances between the right and left wings and the soil surface.

10. The agricultural harvester of claim 9, wherein the at least one wing height sensor comprises at least one drag arm coupled to at least one rotation sensor and attached to at least one bottom portion of the right wing, the left wing, or both, wherein the at least one rotation sensor is configured to output the right and left wing height position signals based on the rotation of the at least one drag arm with respect to the at least one rotation sensor, and the right and left wing height position signals are indicative of the respective distances between the right and left wings and the soil surface.

11. The agricultural harvester of claim 9, wherein the at least one wing height sensor comprises at least one laser, ultrasonic, or radar sensor configured to detect the respective distances between the right and left wings and the soil surface.

12. The agricultural harvester of claim 1, further comprising at least one header height sensor configured to output a center section height position signal indicative of the distance between the center section of the header and the soil surface, wherein the controller is further configured to output a lift signal in response to determining that the distance between the center section of the header and the soil surface is less than a center section height threshold.

13. A system comprising:
a controller comprising a processor and a memory device, wherein the controller is configured to:
receive right and left wing angle signals indicative of respective angles of a right wing of a header and a left wing of the header with respect to a center section of the header;
receive right and left wing height position signals indicative of respective distances between the right wing and the left wing and a soil surface;
determine whether the angle of the right wing, the left wing, or both exceeds an angle limit threshold based at least in part on the right and left wing angle signals;
output a tilt signal to a tilt actuator in response to determining that the left wing angle or the right wing angle exceeds the angle limit threshold, wherein the tilt actuator is configured to drive the center section to tilt in response to receiving the tilt signal, and the tilt signal is indicative of instructions to maintain the respective distances between the right wing and the left wing and the soil surface within a target height threshold; and output a lift signal to the lift actuator in response to determining that the right wing angle and the left wing angle exceed the angle limit threshold to drive the center section to translate, wherein the lift signal is indicative of instructions to maintain the respective distances between the right and left wings and the soil surface within the target height threshold;

wherein the tilt actuator comprises a maximum tilt angle threshold, and the controller is configured to output the lift signal in response to determining that rotation of the tilt actuator exceeds the maximum tilt angle threshold.

14. The system of claim 13, wherein the target height threshold comprises a lower target height threshold limit at a height below a target height and an upper target height threshold limit at a height above the target height.

15. The system of claim 14, wherein the controller is further configured to receive the target height from a user interface.

* * * * *